United States Patent [19]

Chapin

[11] Patent Number: 4,642,152
[45] Date of Patent: * Feb. 10, 1987

[54] DRIP IRRIGATION SYSTEM EMPLOYING FLOW REGULATION

[76] Inventor: Richard D. Chapin, 368 N. Colorado Ave., Watertown, N.Y. 13601

[*] Notice: The portion of the term of this patent subsequent to Feb. 25, 2003 has been disclaimed.

[21] Appl. No.: 634,475

[22] Filed: Jul. 25, 1984

Related U.S. Application Data

[62] Division of Ser. No. 364,213, Apr. 1, 1982, Pat. No. 4,473,191.

[51] Int. Cl.⁴ ............................................. B29C 53/00
[52] U.S. Cl. .................................... 156/203; 156/218; 156/290; 156/291; 156/466; 264/284
[58] Field of Search ........... 156/203, 218, 231, 244.11, 156/244.13, 244.15, 242, 245, 291, 428, 466, 290; 405/44; 239/542, 145; 264/285, 284, 209.1, 209.2, 173, 46.3, 46.1, 506, 508, 514; 138/103, 121; 425/362

[56] References Cited

U.S. PATENT DOCUMENTS

| | | | |
|---|---|---|---|
| Re. 28,095 | 7/1974 | Chapin | 405/44 |
| 2,798,768 | 7/1957 | Babin | 239/145 |
| 2,895,170 | 7/1959 | Carlile | 264/284 |
| 2,988,774 | 6/1961 | Hely | 264/284 |
| 3,361,359 | 1/1968 | Chapin | 239/145 |
| 3,426,544 | 2/1969 | Curtis | 405/44 |
| 3,467,142 | 9/1969 | Boyle et al. | 239/450 X |
| 3,478,138 | 11/1969 | Friesner | 264/284 |
| 3,540,959 | 11/1970 | Connor | 264/284 |
| 3,672,571 | 6/1972 | Goodricke | 239/145 |
| 3,777,987 | 12/1973 | Allport | 239/542 |
| 3,816,206 | 6/1974 | Coster | 156/218 |
| 3,866,833 | 2/1975 | Shibata et al. | 239/76 |
| 3,870,236 | 3/1975 | Sahagun-Barragan | 239/542 |
| 3,874,598 | 4/1975 | Havens | 239/542 |
| 3,896,999 | 7/1975 | Barragan | 239/542 X |
| 3,903,929 | 9/1975 | Mock | 239/145 X |
| 4,009,832 | 3/1977 | Tiedt | 239/542 |
| 4,047,995 | 9/1977 | Leal-Diaz | 239/542 X |
| 4,173,309 | 11/1979 | Drori | 239/542 |
| 4,177,946 | 12/1979 | Sahagun-Barragan | 239/542 X |
| 4,195,784 | 4/1980 | Gilead | 239/542 |
| 4,196,853 | 4/1980 | Delmar | 239/116 |
| 4,199,106 | 4/1980 | Kojimoto et al. | 239/542 |
| 4,235,380 | 11/1980 | Delmer | 239/542 X |
| 4,247,051 | 1/1981 | Allport | 239/542 |
| 4,473,191 | 9/1984 | Chapin | 239/542 |
| 4,534,515 | 8/1985 | Chapin | 239/542 |
| 4,572,756 | 2/1986 | Chapin | 156/203 |

Primary Examiner—Michael Ball
Assistant Examiner—Ramon R. Hoch
Attorney, Agent, or Firm—Fleit, Jacobson, Cohn & Price

[57] ABSTRACT

An elongated fluid distributing hose for use in an irrigation system for plants, vegetables, and the like. The hose incorporates a particular arrangement of a main supply channel for gross water movement, and a water distributing network for fine water movement. Water pressure reduction takes place in the water distributing network at the point of the passing of the water from the high pressure main supply channel through a series of first fluid-passing openings or inlet stations through one or more smaller fluid-restricting passages. In certain embodiments, a structure is provided to perform a pressure regulating function in each of the smaller passages. In one embodiment, pressure reduction between an inlet and an outlet is by way of serpentine fluid-restricting path. A novel method and machine are employed to manufacture the various hoses embodying the teachings of the subject invention.

20 Claims, 36 Drawing Figures

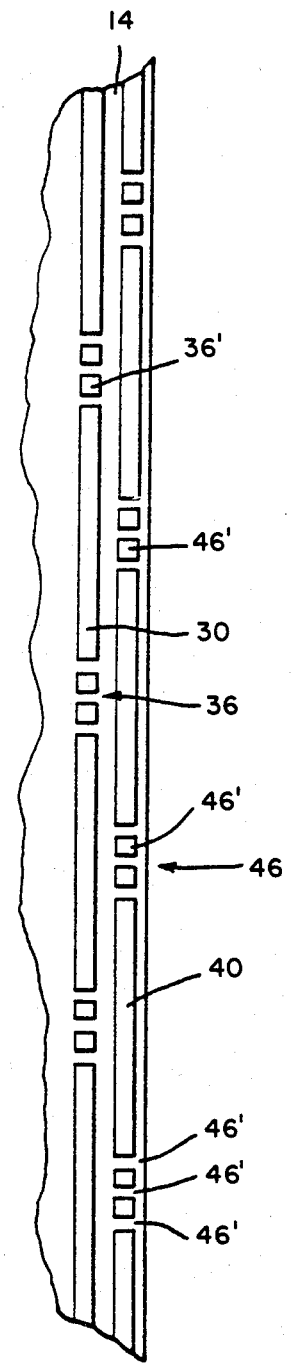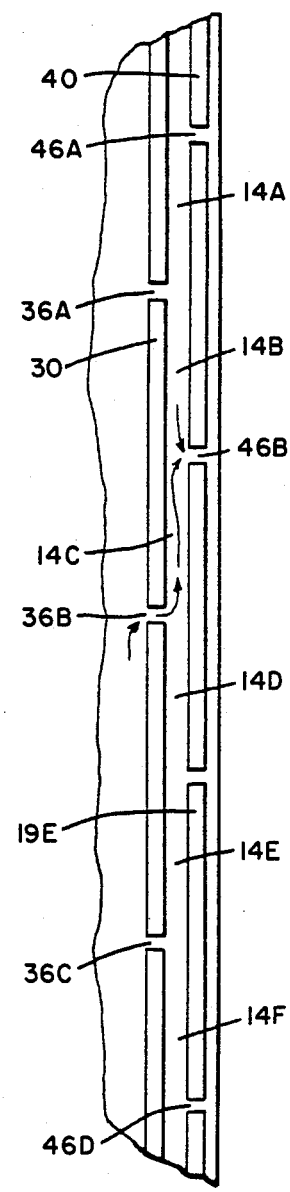
FIG. 5
FIG. 6

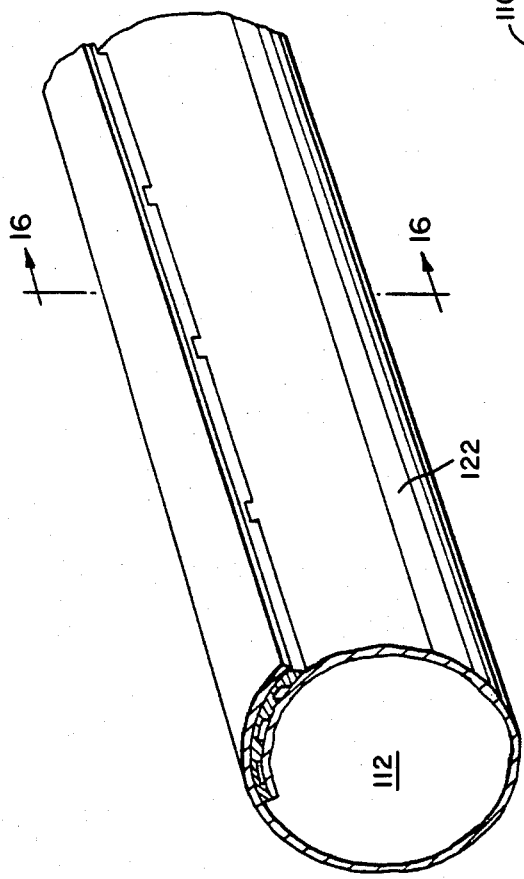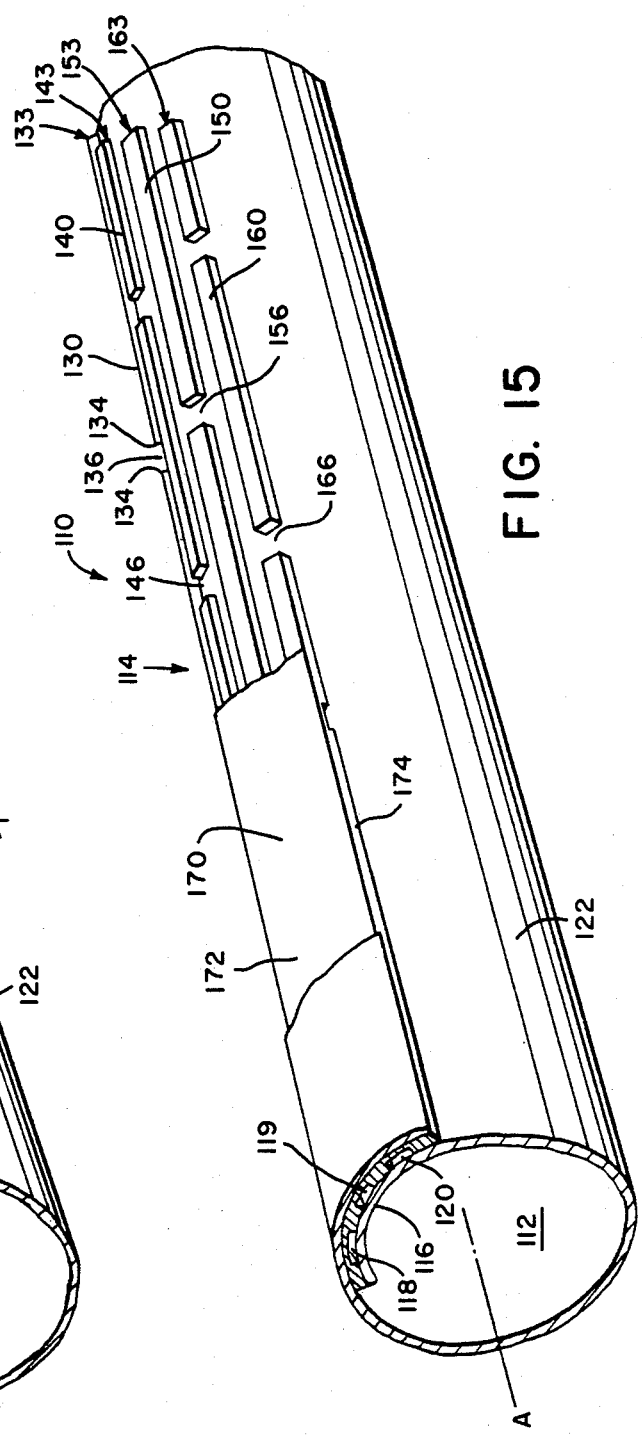

FIG. 20
FIG. 21
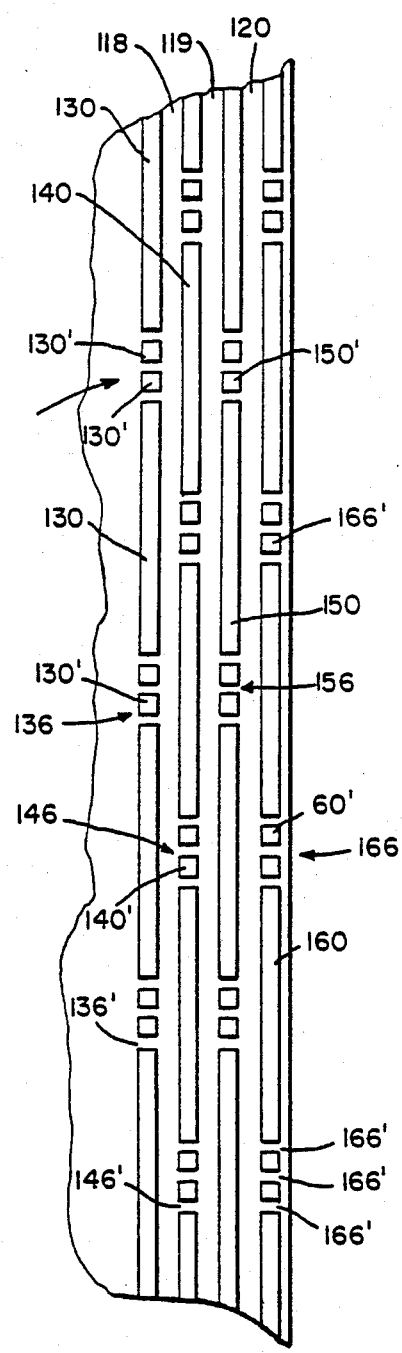
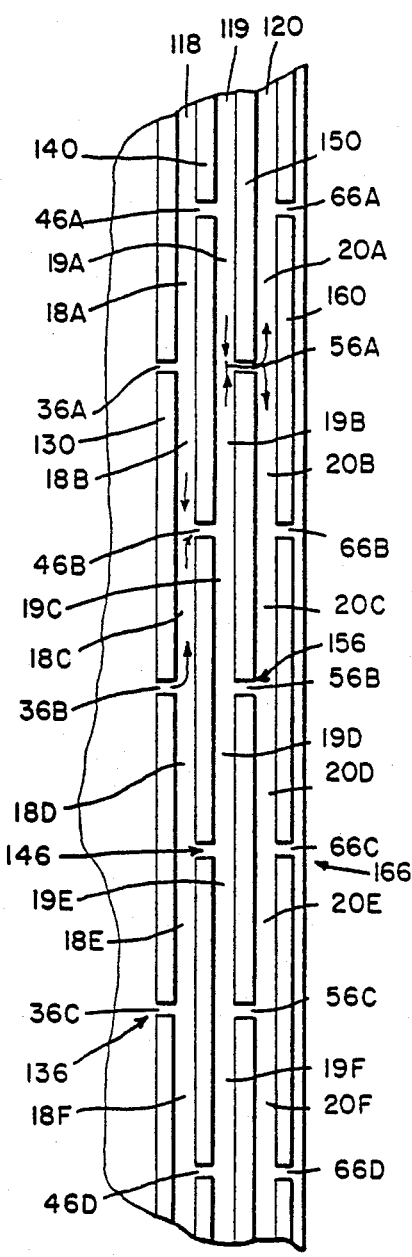

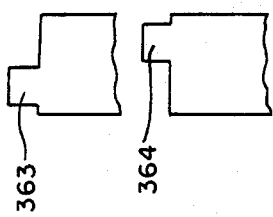
FIG. 27
FIG. 28
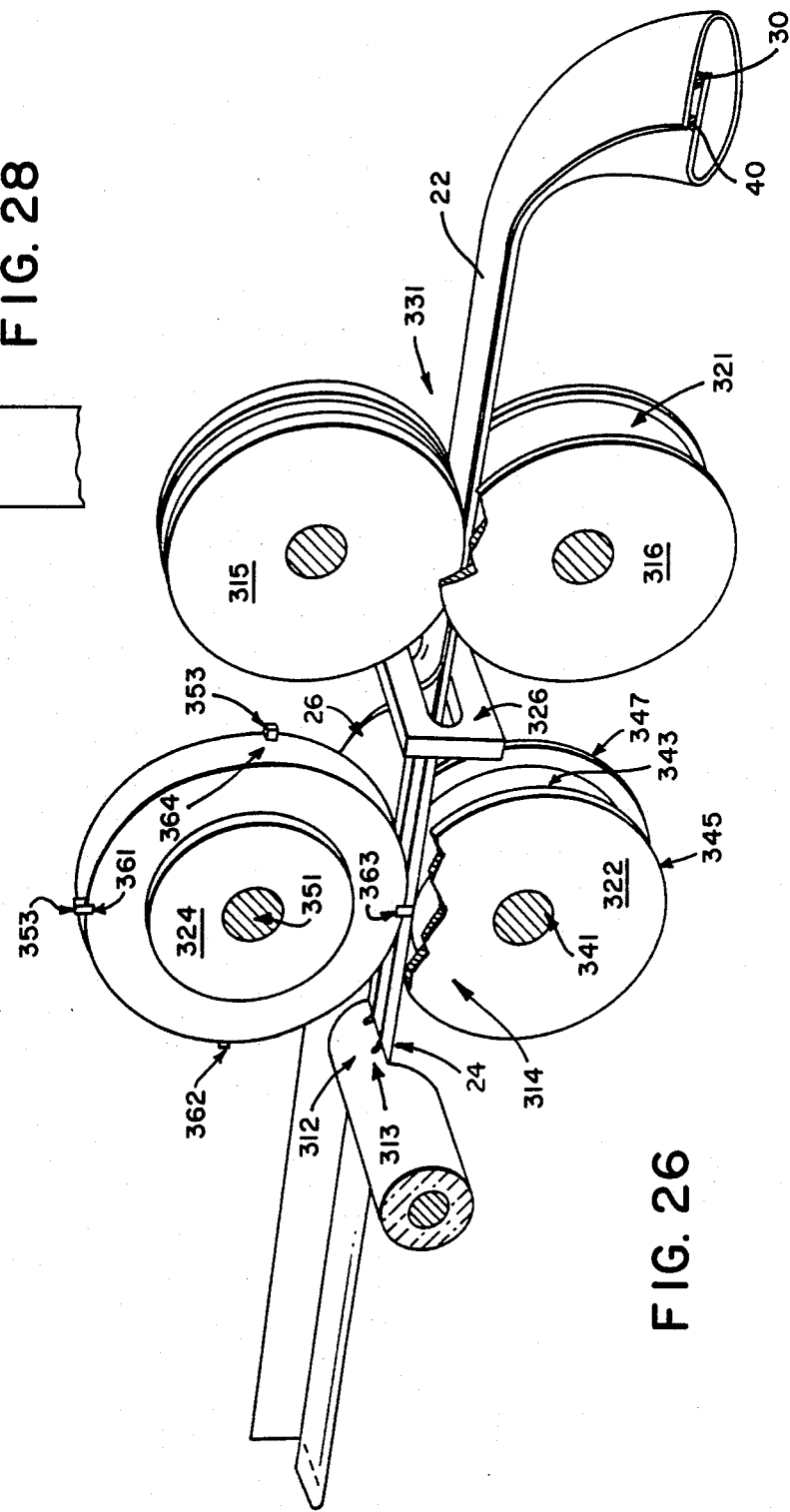
FIG. 26

FIG. 29
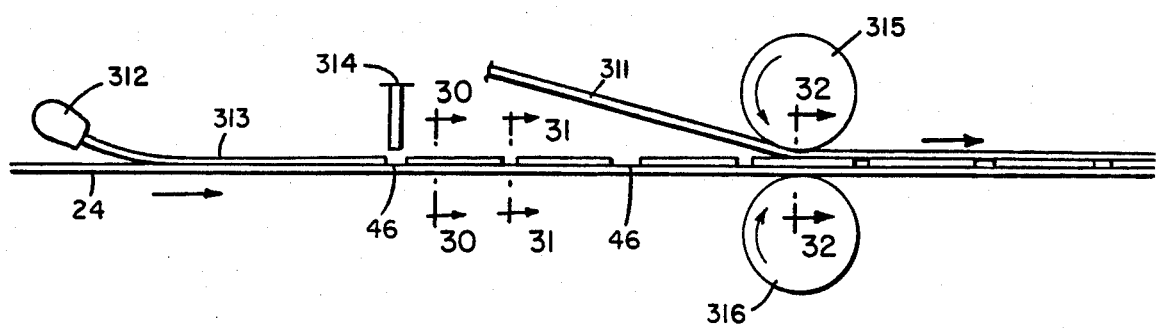
FIG. 30
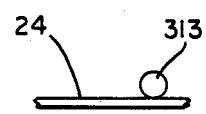
FIG. 31
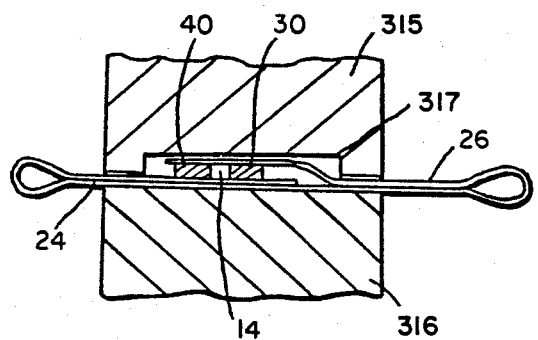
FIG. 32

DRIP IRRIGATION SYSTEM EMPLOYING FLOW REGULATION

This is a divisional of application Ser. No. 364,213 filed Apr. 1, 1982 Pat. No. 4,473,191 issued Sept. 25, 1984.

BACKGROUND OF THE INVENTION

1. Field of the Invention

This invention relates to a water distributing hose for use in a trickle irrigation or drip irrigation system.

2. Background of the Prior Art

The present invention relates to irrigation systems particularly adapted for the surface or subsurface watering of long runs of crops, whether on greenhouse benches or in the field, and more specifically relates to a trickle irrigation system wherein the water is allowed to discharge slowly, directly at the desired point of application, normally about the base of the plants.

Recent innovations in irrigation technology have been directed to the concept of trickle irrigation. As an example, in row crops, it is only necessary to irrigate the rows and not the entire field. such a limiting of the watering to the rows by trickle irrigation can effect a water saving of approximately 40 to 50 percent. As the need for food for the world's expanding population increases and water shortages become more acute, such savings will become increasingly more important. In this connection, trickle irrigation is especially significant because it delives water at or below the surface and provides for a significant conservation of water.

Since there is considerably less water used in trickle irrigation, it is important that the water be directed precisely to the plant's root area. The flow from some known prior art hoses comes out in a tiny squirt, which can be blown by the wind so that sometimes it does not uniformly wet the area next to the plant row. When an irrigation hose is located on top of the soil, it is often twisted sligthly by the contour of the soil. This causes the squirt to come out at different angles. The water from some of the squirts could fall next to the plant row and other squirts would be directed between the rows of plants leaving some root areas dry.

When the irrigation hose is used under a plastic mulch, as is frequently done, the flow sometimes squirts against the underside of the plastic mulch which deflects the water and causes part of it to follow on the underside of the plastic and run off into the aisle between the plant rows. The squirt sometimes has enough force to cause a tiny washout on elevated beds so that wate runs down the side of the bed into the aisle rather than remaining on top of the bed surface and uniformly penetrating the entire bed.

To be practical, trickle irrigation must provide for the delivery of water at a slow uniform rate over long lengths or runs of hose. In the past, various trickle irrigation systems have been tried, including pipes with small holes, pipes with various types of small outlet members, pipes with small tubes for outlets, plastic pipes with slits, tubes which ooze water through the wall, and hoses which ooze water through a sewn seam. Each type has depended on a small orifice, low pressure, friction created in a long outlet member such as a tube, or a combination of these to limit the flow through each individual outlet. However, there are disadvantages associated with each such known system. For example, the use of extremely small orifices such as holes, slits, or the like, tend to clog easily. Tube outlets and special outlet members are relatively expensive to produce and ship, particularly when considering the large quantities required. In addition, low pressure systems and tubes which provide for an oozing of the water through the wall are not capable of producing a uniform flow along the length of the hose or the like, particularly on sloping runs.

Since drip irrigation hoses are commonly made with wall thicknesses ranging from 0.003" to 0.030", the hoses are sometimes subject to damage from ants. When this occurs, ants have been known to go through the main wall of the hose, but usually they will chew around the edges of existing discharge openings, enlarging them, sometimes to several times their original diameter. This causes the hose to have a heavy water flow at the enlarged discharge opening and a much lower flow in other nearby openings, resulting in a non-uniform irrigation.

One water distributing hose which has met with success is that disclosed in U.S. Pat. No. Re. 28,095, reissued July 30, 1974 to Chapin. In the reissue patent, a multi-chamber water distributing hose is shown in the context of a trickle irrigation system. Another hose which has met with success is that disclosed in copending U.S. patent application Ser. No. 261,699, filed May 8, 1981, in the name of Chapin. The hose of the Chapin application is an elongated water distributing hose capable of effectively watering large areas with readily available water pressures and in a manner whereby an essentially uniform watering is achieved. The pressure is substantially maintained throughout the length of the hose through a stacked arrangement of first, second, and third fluid channels, which enable a maintaining of the relatively high pressure throughout the length of the hose and the reduction of this pressure directly at the point of the passing of the water from the high pressure first fluid channel through a series of first fluid-passing openings to the much smaller second fluid channel, and a further pressure reduction as the water passes within the fluid channel between a series of second fluid-passing openings and a series of discharge fluid-passing openings.

Still another hose is that disclosed in copending U.S. Pat. No. 4,534,515, issued Aug. 13, 1985, its divisional, U.S. Pat. No. 4,572,756, issued Feb. 25, 1986, and its continuation-in-part application, Ser. No. 550,138, filed Nov. 4, 1983, now abandoned.

Although the performance of all of the Chapin hoses has been excellent, there is, nevertheless, always a need for improved performance. The present invention is directed toward filling that need while at the same time minimizing the disadvantages described above in connection with known systems.

SUMMARY OF THE INVENTION

The present invention relates to an elongated fluid distributing hose for use in an irrigation system for plants, vegetables, and the like. The hose of the present invention enables the construction of a drip irrigation system which is relatively inexpensive while at the same time capable of effectively watering large areas with readily available water pressures and in a manner whereby an essentially uniform watering is achieved. This desired uniform watering results notwithstanding sloping ground conditions and the like. Water pressure is substantially maintained throughout the length of the tube without requiring the use of extremely small orifices which easily clog from impurities, reliance instead being had on a particular arrangement of a main supply channel for gross water movement, and a water distributing network for fine water movement. The main supply channel exhibits relatively high water pressure throughout the length of the hose. A reduction of this pressure takes place in the water distributing network with the passing of the water from the high pressure main supply channel through a series of first fluid-passing openings or inlet stations to a much smaller first fluid-restricting passage. In a second embodiment, the fluid is passed through second and third fluid-restricting passages and is eventually released to the exterior of the hose through a series of discharge fluid-passing openings or outlet stations. In the second embodiment, the flow-restricting passages include a flow regulating structure.

The hose of the instant invention is preferably of a thin water-impervious plastic material, such as polyethylene. The main supply channel moves the water at a relatively high pressure along the full length of the hose for discharge into the water distributing network for final discharge out of the hose itself through a number of openings or outlet stations in the outer passage. The pressure decrease within the water distributing network is such that the flow of water at the outlet stations of the network is in the form of a drip under substantially quiescent conditions.

A novel method and machine are employed to manufacture the hose embodying the teachings of the subject invention. Basically, the hose is manufactured by moving an elongated impervious film in a given direction. The film is oriented to expose an outer surface and margin of the film. Disposed on this outer surface in a parallel array is a plurality of hot melt plastic beads. The beads are placed on the film by a conventional extrusion nozzle. The beads are positioned so that they extend along the margin, essentially parallel to the longitudinal axis of the elongated film. In the second embodiment, the nozzle extrudes the beads as part of the overall flow regulating structure.

The film continues to move in the given direction and transports the previously deposited hot melt beads to a molding station where each of the beads is molded by deformation in a predetermined manner by a molding tooth to create a permanent depression within each of the beads, thereby molding each hot melt bead into a series of longitudinally-extending, spaced apart strips. The spaces created by the molding tooth eventually become the fluid passing openings between the various flow channels. In another embodiment, the molding wheel is configured to create an entire flow restricting channel with a zig-zag pattern.

The film continues to move through a guide which causes the flat material to be folded upon itself so that the interior surface of the other margin of the film comes into contact with the hot melt beads. The structure then passes through a pair of forming wheels which places the top film in intimate contact with the top of the hot melt strips causing the top film to bond to the spaced apart strips at a precise distance from the common wall of the film thus creating the flow restricting passages.

Advantages and objects of the present invention include the provision of a system which can be inexpensively produced, such being essential because of the vast quantities of hose needed to irrigate field crop installations which typically involve thousands of acres. The system is compact, the hose capable of being flattened and rolled, thereby simplifying the handling, storage, shipping, installation and removal. The hose used is of a highly durable nature. In addition, large areas can be simultaneously watered without requiring excessively high pressures or large volumes of water with the distribution of the water being uniform over extremely long lengths as well as on sloping layouts and in both surface and subsurface installations.

These together with other objects and advantages, which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a schematic view of a second embodiment of the hose of FIG. 4.

FIG. 6 is a schematic view useful in explaining the operation of the hose of FIG. 4.

FIG. 14 is a perspective view of a portion of a hose embodyng the further teachings of the subject invention.

FIG. 15 is a view similar to that of FIG. 14 with a portion of the hose and themoplastic sheet removed to reveal the interior structure of the flow restricting passages.

FIG. 20 is a schematic view of another embodiment of the hose of FIG. 15.

FIG. 21 is a schematic view useful in explaining the operation of the hose of FIG. 4.

FIG. 26 is a perspective diagrammatic drawing to illustrate an embodiment of a machine used to manufacture a hose according to the teachings of the present invention.

FIG. 27 is a view taken along lines 27—27 of FIG. 26.

FIG. 28 is a view taken along lines 28—28 of FIG. 26.

FIG. 29 is a schematic diagram illustrating the operation of the machine shown in FIG. 26.

FIG. 30 is a view taken along lines 30—30 of FIG. 29 and is used to show the placement of a hot melt bead onto the thermoplastic film forming the outer portion of the hose.

FIG. 31 is a view taken along lines 31—31 of FIG. 29 and is used to schematically illustrate the formation of an indentation in the hot melt bead.

FIG. 32 is a view taken along lines 32—32 of FIG. 29 and is used to schematically illustrate the placement of two hot melt beads and their passage through the pair of symbolically shown forming rolls during the manufacture of the hose.

DETAILED DESCRIPTION OF THE PREFERRED EMBODIMENTS

Figure 1:
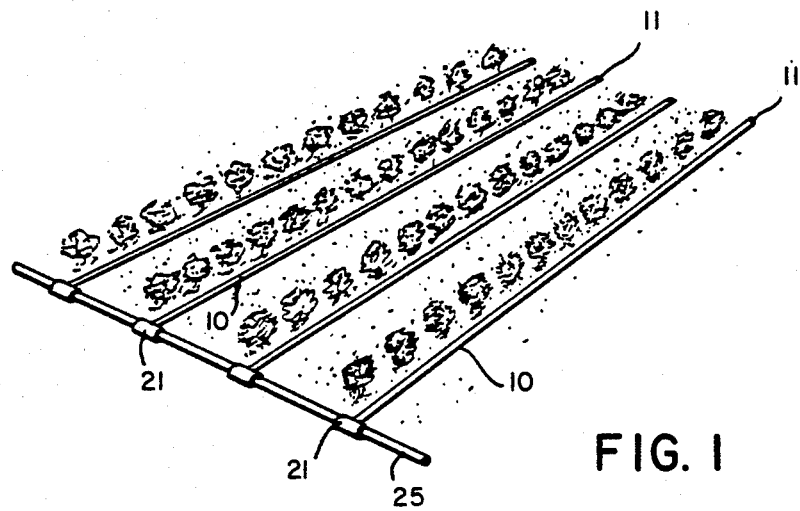
FIG. 1 is a perspective view showing a portion of a field making use of the irrigation system of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to FIGS. 1–4 and 9, reference 10 is used to generally designate the water distributing hose embodying the teachings of the present invention. The hose 10 basically comprises a gross water distributing channel 12 and a fine water flow-restricting passage 14. Adjacent to channel 12 and sharing a common wall 16 is the passage 14, disposed about the exterior of the main supply channel 12. The passage is substantially parallel to the longitudinal axis A of the main supply channel.

In use, the main supply channel 12 is connected to a source of pressurized water. This can be effected, for example, by connecting the main supply channel 12 at one end of hose 10 to a suitable fitting 21 in main 25. The other end 11 of the hose 10 is closed off to prevent escape of the water entering the hose. Such an arrangement has been generally illustrated in FIG. 1 wherein the hose 10 is illustrated next to rows of vegetables in a large field. It will be appreciated that such an arrangement is also equally adaptable for use in greenhouse and home gardens.

Figure 2:
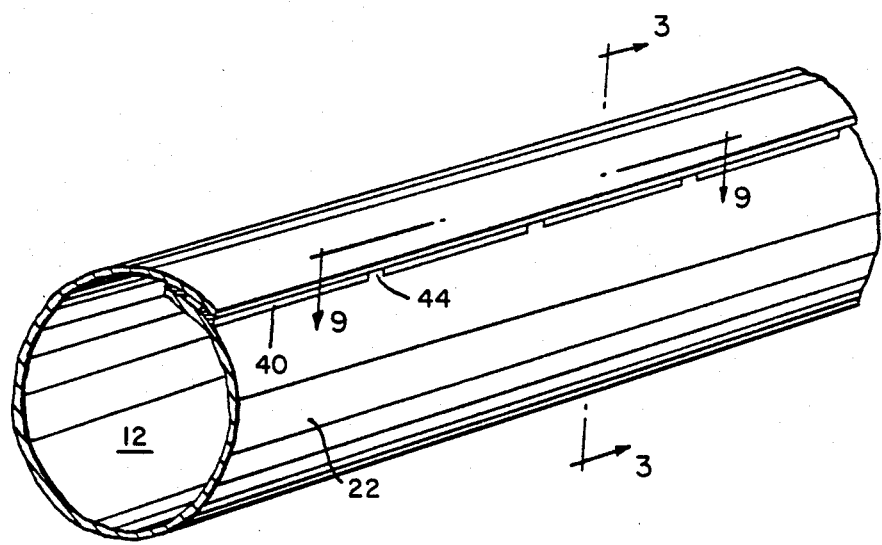
FIG. 2 is a perspective view of a portion of a hose embodying the teachings of the subject invention.
Figures 3, 4:
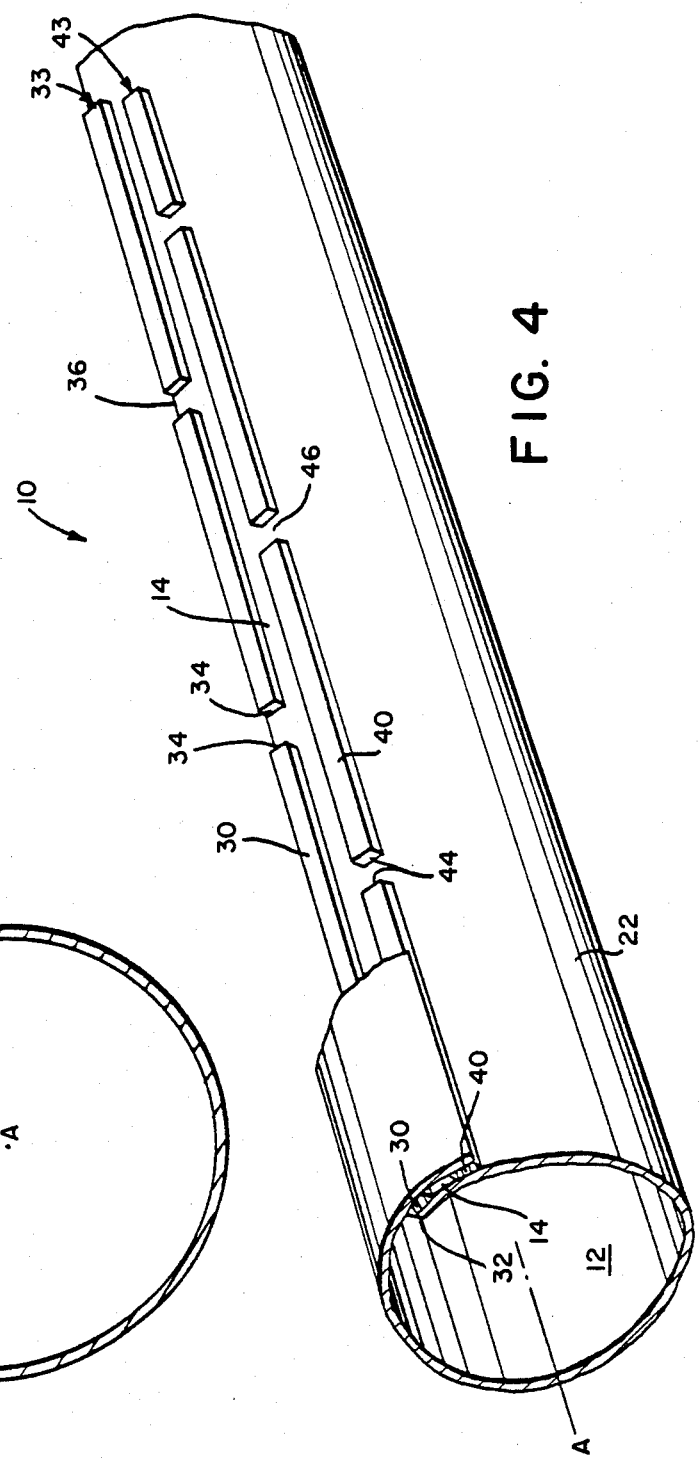
FIG. 3 is a section taken along lines 3—3 of FIG. 2.
FIG. 4 is a view similar to that of FIG. 2 with a portion of the hose removed to reveal the interior structure of the flow restricting passages.

With reference to FIGS. 2 through 4, an elongated layer or sheet 22 or thin water-impervious plastic material, such as a thermoplastic film, terminates in two longitudinally extending margins 24 and 26 which overlap each other in a predetermined fashion. Interposed between the overlapping margins are a series of elongated longitudinally extending strips of varying lengths and arranged in a particular manner, yet to be described, to define the flow-restricting passage 14. The strips are also made from a water-impervious plastic material.

A first set of strips 30 are positioned near the edge 32 of margin 24, so that each of the strips define an axis substantially parallel to and equidistant from the longitudinal axis A of the hose 10. The ends 34 of the strips are periodically spaced from each other to define inlet stations as a series of fluid-passing openings 36 therein. The frequency of the inlet stations typically ranges from a few inches to several feet throughout the full length of the hose. The inlet stations or first fluid-passing openings 36 are positioned so that they form a means of fluid communication between the main supply channel 12 and the flow-restricting passage 14. The spaces between the strips 30 define the first inlet stations 36 and the strips 30, in effect, define a common wall 33 between the main supply channel 12 and the passage 18.

In like manner, a second set of strips 40 are positioned near the edge 62 of the margin 26 so that the strips define an axis substantially parallel to the longitudinal axis A of the hose 10. The placement of the stris 40 is such that they are positioned near to, but spaced from, the wall 33 defined by strips 30. The ends 44 of the strips are spaced from each other to define a series of fluid discharge opeings or outlet stations 46 to provide for fluid communication between the passage and the exterior of the hose. In the preferred embodiment, the spacing between the outlet stations 46 is substantially the same as that between the inlet stations 36.

In the preferred embodiment, the inlet and outlet stations 36 and 46 are substantially of a rectangular cross section and precisely formed by the positioning of the strips between the overlapping margins 24 and 26. The size of the outlets at each station is chosen so that there is a minimum chance of clogging as water passes through the station.

For the purposes of simplifying the presentation, the cross passageways or fluid passing stations 36 and 46 in FIGS. 1–4 are shown in the context of a less preferred embodiment as a single opening. However, in a more preferred embodiment, such as that shown in FIG. 5, three or more openings are used closed together to comprise each station. By example, the three openings 46' constitute one fluid passing station which minimizes the chance of clogging as the flow passes through the station. This provides multiple openings at each station so that if one opening should clog, the other two openings can carry the flow through the station.

It is understood that a larger number of closely spaced fluid passing openings may constitute the inlet and outlet stations 36 and 46 as long as the total cross-sectional area of the openings associated with each station exceed a minimum size so that there is a minimum amount of clogging across the station.

In the preferred embodiment, having 8 inches between the centers of like fluid passing stations, the dimension of each fluid passing opening is approximately 0.060 inches in width, a height substantially the same as the height of strips 30 and 40 of about 0.010 inches and a length of about 0.070 inches which is substantially the same as the width of the strips.

The length of the flow passage through each fluid passing opening is substantially longer than the mean average between the width and height dimensions of the fluid passing opening. In effect, each fluid passing opening is in itself a short pressure-drop channel. With reference to FIG. 6, this pressure-drop phenomena may be explanined as follows. The flow from segment 14B of flow channel 14 comes directly toward the flow from segment 14C which is coming from the opposite direction and they meet at the fluid passing outlet 46B. Each flow thus makes a 90° turn and flows straight for about 0.070 inches through the length of fluid passing opening 46B. It is desirable to have the length of the fluid passing opening (for example, 46B), which is also the thickness of wall 40, at least three times the thickness of the common wall 16 to get an increase in friction and pressure loss as the flow makes the sharp 90° turn in going through the fluid passing openings from the flow restricting passage to the exterior of the hose. The same relationship exists for the remaining fluid-passing opening 36 relative to the thickness of common wall 16.

In the preferred embodiment of FIG. 4, using a 6 mil. polyethylene film, the passage 14 has a generally rectangular configuration with a height of approximately 0.010 inch and a width of about 0.070 inch. The fluid-passing openings 36 are spaced approximately eight inches apart, and the outer openings 46 are spaced eight inches apart with each opening 46 being located intermediate between, but spaced from, a pair of openings 36.

In a preferred embodiment, as the main supply channel 12 of hose 10 is pressurized at 6 psi, water flows through first inlet stations 36 located in wall member 33 which separates channel 12 and passage 14. The flow is then divided and moves within passage 14 to the nearest outlet station 46 on either side of the first inlet station 36. Flow-restricting passage 14 has a length between inlet stations and a cross section of a size to reduce the pressure by approximately 5.9 psi within passage 14 between fluid inlet stations 36 and outlet stations 46. The flow is then discharged to the exterior of the hose through discharge fluid passing openings or outlet stations 46 in wall member 43 with a slight pressure loss of about 0.1 psi.

Because of the friction created as water passes through the small fluid passage 14, the pressure adjacent to the discharge fluid-passing openings 46 is negligible (such as 0.1 psi or less), and the water actually drips out through the openings 46 under substantially quiescent conditions under almost no outward pressure.

The pressure drop loss between any inlet station and its nearest upstream outlet station depends on the width and height of the intermediate flow restricting passage, the length of the same passage, and the rate of water passing through it.

The flow rate of the preferred embodiment is generally linear with the pressure in the main supply channel, so that the flow from an outlet opening at any given point along the hose is increased or decreased at substantially the same rate that corresponds to a pressure increase or decrease at that same point within the main supply channel.

As shown in FIG. 4, the main supply channel 12, formed by wall member 22, becomes circular when pressurized, forming a round tube essentially free of internal partitions or other obstructions that would provide additional surfaces in the flow channel causing more loss of pressure due to friction, as well as making the hose more difficult to collapse for storage and shipment.

As the hose is installed in the field, it is preferable to orient the hose so that the flow-restricting passages are on top. Foreign particles in the water normally settle to the bottom of the main supply channel and are less apt to enter the fluid passing openings and flow passages when they are on top of the hose.

Figure 7:
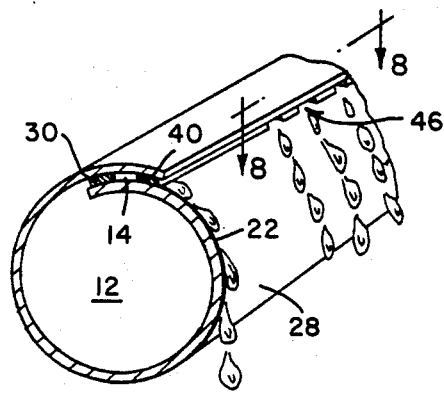
FIG. 7 is a perspective view of a portion of a hose showing a further modification to the hose of FIG. 4.
Figure 9:
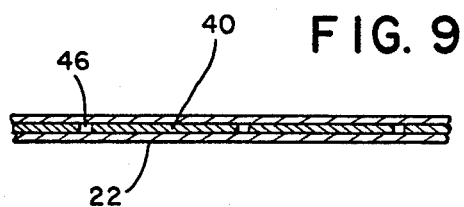
FIG. 9 is a view taken along lines 9—9 of FIG. 2.
Figure 8:
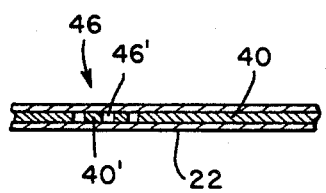
FIG. 8 is a view taken along lines 8—8 of FIG. 7.

Three elements are combined to cause the flow from the discharge fluid passing openings 46 to tend to fall directly below each opening 46, or in the case of three closely spaced openings, each opening 46' as shown in FIGS. 7 and 8. First, the discharge fluid passing openings 46 are located in an upper quadrant of the hose rather than in the middle and on top of the hose. Second, the flow from the discharge openings 46 tends to come out approximately normal to the last set of strips 40 and pointed in a slightly downward angle when the hose is pressurized and in its normal upright position. Third, the common wall 16 forms one portion of the perimeter of each discharge fluid passing opening 46 so that the flow is in direct contact with the outer wall 28 as it passes through the discharge fluid passing openings and tends to cling to the surface of the outer wall 28 until it drops on the soil directly below each discharge fluid passing opening 46.

While an 8 psi inlet water pressure is used to illustrate operation of a preferred embodiment, embodiments incorporating the teachings of the present invention will operate at inlet water pressures ranging from about 2 psi to 50 or more psi, depending on the strength of wall 22, fluid-passing opening sizes, ratios, etc.

FIGS. 10-13 show a modification to be made to the hose of FIG. 2 to provide another embodiment embodying the teachings of the subject invention.

With reference to FIGS. 10 through 13, the elongated layer or sheet 22 of thin water-impervious plastic material, such as a thermoplastic film, terminates in two longitudinally extending margins 24 and 26 which overlap each other in a predetermined fashion. Interposed between the overlapping margins is an elongated flat sheet 70 with elongated longitudinally extending ridges or strips of varying lengths arranged in a particular manner, yet to be described, to define the fine water-distributing passage 14. The flat sheet with ridges is also made from a water-impervious plastic material.

Figure 10:
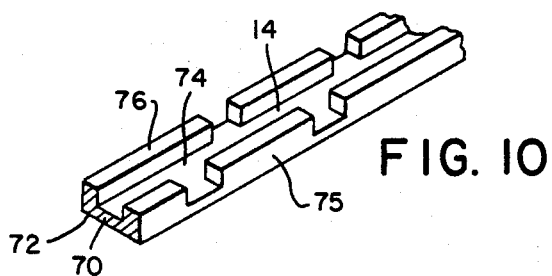
FIG. 10 is a perspective view showing a thermoplastic sheet with ridges for use in modifying the embodiment of FIG. 4.
Figure 11:
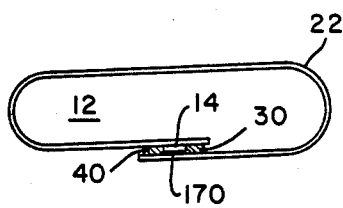
FIG. 11 is a plan end view showing placement of the themoplastic sheet in the hose of FIG. 4.
Figure 12:
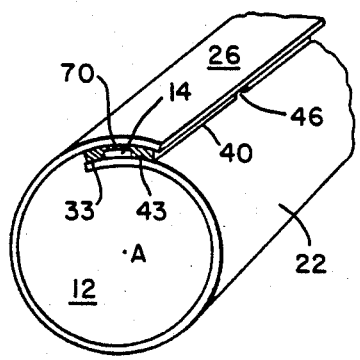
FIG. 12 is a perspective view of still another embodiment of a hose incorporating the sheet structure of FIG. 10.

With reference to FIGS. 10-13 and as oriented in FIG. 10, the elongated sheet 70 includes a planar bottom surface 72 and a planar upper surface 74. The sheet also defines right and left longitudinal edges 75 and 76, respectively. Defined on the upper surface 74 are the series of ridges, which together with the upper surface defines three sides of flow-restricting channel 14. As shown in FIG. 12, the bottom surface 72 of the sheet 70 is in intimate contact with and secured to the margin 26 of sheet 22. At the same time, each of the ridges is in intimate contact with and secured to the margin 24, thus completing the flow-restricting channel structure.

In all other respects the modification of FIGS. 10-13 is substantially the same as the embodiment of FIGS. 1-4.

Figure 13:
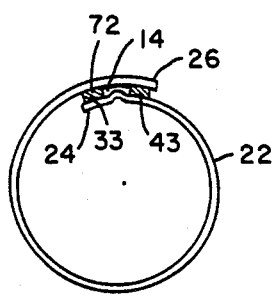
FIG. 13 is a plan end view of the hose of FIG. 11.

FIG. 13 illustrates the flow regulating feature of this invention. The outer wall of flow channel 14 is made up of the outer wall margin 26 with the addition of the flat sheet 70 making its total thickness greater and stronger than the portion of flow channel 14 defined by the common wall 16. A pressure differential across the thinner common wall 16 causes wall 16 to deflect outwardly into the flow channel 14 while the outer wall margin 26 and sheet 70 remain in their normal configuration due to the extra thickness they create. This reduces the size of the flow channel 14 in response to pressure and provides uniform watering over the length of the hose even though there might be considerable differences in pressure in the main supply channel 12 due to friction losses or changes in elevation. The major pressure differential is found in about the last third of channel 14 as measured between an inlet station 36 and its associated outlet station 46.

FIGS. 14–17 show another embodiment of a hose embodying the teachings of the present invention. The hose 110 basically comprises a gross water distributing channel 112 and a fine water distributing network 114. Adjacent to channel 112 and sharing a common wall 116 is the network 114, which basically comprises a plurality of flow restricting passages 118–120, positioned one next to the other in a common curved plane and disposed about the exterior of the main supply channel 112. Each of the passages is substantially equidistant from the longitudinal axis A of the main supply channel. As can be seen, the three fluid passages 118–120 are arranged in a generally parallel relationship throughout the length of the hose.

In use, the main supply channel 112 is connected to a source of pressurized water in much the same way as the first embodiment with reference being made to FIG. 1.

Figure 16:
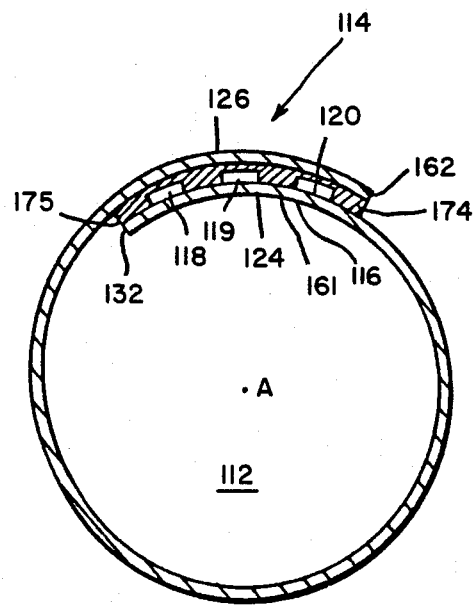
FIG. 16 is a section taken along lines 16—16 of FIG. 14.

With reference to FIGS. 14 through 16, an elongated layer or sheet 122 of thin water-impervious plastic material, such as a thermoplastic film, terminates in two longitudinally extending margins 124 and 126 which overlap each other in a predetermined fashion. Interposed between the overlapping margins is an elongated flat sheet 170 with elongated longitudinally extending ridges or strips of varying lengths arranged in a particular manner, yet to be described, to define the fine water-distributing network 114. The flat sheet with ridges is also made from a water-impervious plastic material.

Figure 17:
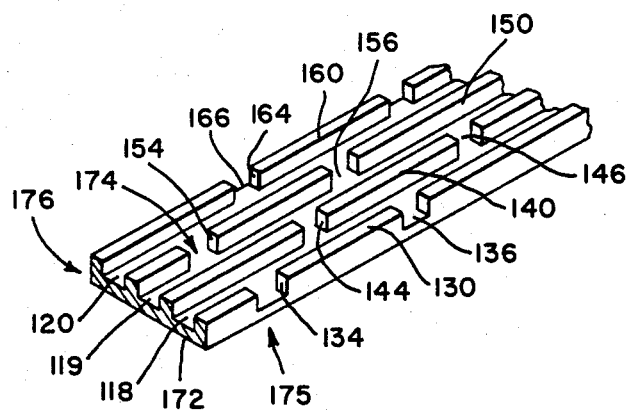
FIG. 17 is a perspective view showing a themoplastic sheet with ridges for use in creating the hose of FIG. 15.

With reference to FIGS. 14–17, and as oriented in FIG. 17, the elongated sheet 170 includes a planar bottom surface 172 and a planar upper surface 174. The sheet also defines right and left longitudinal edges 175 and 176, respectively. Defined on the upper surface 174 are the series of ridges, which together with the upper surface defines three sides of each flow-restricting channel 118, 119 and 120. As shown in FIG. 15, the bottom surface 172 of the sheet 170 is in intimate contact with and secured to the margin 126 of sheet 122. At the same time, each of the ridges is in intimate contact with and secured to the margin 124, thus completing the flow-restricting channel structure.

Again with reference to FIGS. 14–17, the particulars of the fine water-distributing network 114 and the arrangement of ridges in a preferred embodiment will now be described. A first set of strips 130 are positioned near the edge 132 of margin 124, so that each of the strips define an axis substantially parallel to and equidistant from the longitudinal axis A of the hose 110. At the same time, the strips 130 define the edge 175 of the sheet 170. The ends 134 of the strips are periodically spaced from each other to define inlet stations as a series of fluid-passing openings 136 therein. The frequency of the inlet stations typically ranges from a few inches to several feet throughout the full length of the hose. The inlet stations or first fluid-passing openings 136 are positioned so that they form a means of fluid communication between the main supply channel 112 and the first flow-restricting passage 118 of the network 114. The spaces between the strips 130 define the first inlet stations 136 and the strips 130, in effect, define a common wall 133 between the main supply channel 112 and the first passage 118.

In like manner, a second set of strips 140 are positioned near to, but spaced from, the wall 133 defined by strips 130. The second set of strips, which like all of the strips are an integral part of the sheet 170, also have their ends 144 spaced from each other to define a further set of fluid-passing openings or inlet stations 146, to form a means of fluid communication between the first passage 118 and the second flow-restricting passage 119. Thus, the second fluid-passing openings 146 are positioned somewhere along the common wall 143 between the first and second passages 118 and 119 as defined by the strips 140. The second fluid-passing openings 146 generally have substantially the same spacing between them as the spacing formed between the first fluid-passing openings or inlet stations 136. In actual practice, the spacing of the second fluid-passing openings 146 can vary from a few inches up to several feet.

Additionally, a third set of strips 150 are positioned near to, but spaced from, the wall 143 defined by strips 140. The third set of strips also have their ends 154 spaced from each other to define a third set of fluid-passing openings or inlet stations 156 to form a means of fluid communication between the second passage and the third flow-restricting passage 120. Thus, the third fluid-passing openings 156 are positioned somewhere along the common wall 153 between the second and third passages 119 and 120 as defined by the strips 150. The third fluid-passing openings 156 have substantially the same spacing between them as the spacing formed between the first fluid-passing openings 136.

Finally, a fourth set of strips 160 are positioned near the edge 162 of the margin 126 so that the strips define an axis substantially parallel to the longitudinal axis A of the hose 110. At the same time, the strips 160 define the edge 174 of the sheet 170. The placement of the strips 160 is such that they are positioned near to, but spaced from, the wall 153 defined by strips 150. The ends 164 of the strips are spaced from each other to define a fourth series of fluid discharge openings or outlet stations 166 to provide for fluid communication between the third passage and the exterior of the hose. In the preferred embodiment, the spacing between the outlet stations 166 is substantially the same as that between the third inlet stations 156.

In the preferred embodiment, the inlet and outlet stations 136, 146, 156 and 166 are substantially of a rectangular cross section and precisely formed by the positioning of the strips between the overlapping margins 124 and 126. The size of the outlets at each station is chosen so that there is a minimum chance of clogging as water passes through the station.

For the purposes of simplifying the presentation, the fluid passing stations 136, 146, 156 and 166 in FIGS. 14–17 are shown in the context of a less preferred embodiment as a single opening. However, in a more preferred embodiment, such as that shown in FIG. 20, three or more openings are used close together to comprise each inlet and outlet station. By example, the three openings 166' constitute one fluid passing station which minimizes the chance of clogging as the flow passes through the station. This provides multiple openings at each station so that if one opening should clog, the other two openings can carry the flow through the station.

It is understood that a large number of closely spaced fluid passing openings may constitute the first, second and third inlet stations 136, 146 and 156 and the discharge stations 166 as long as the total cross-sectional area of the openings associated with each station exceed a minimum size so that there is a minimum amount of clogging across the station.

In the preferred embodiment, having 8 inches between the centers of like fluid passing stations, the dimension of each fluid passing opening is approximately 0.060 inches in width, a height substantially the same as the height of strips 130, 140, 150 and 160 or about 0.014 inches and a length of about 0.070 inches which is substantially the same as the width of the strips.

The length of the flow passage through each fluid passing opening is substantially longer than the mean average between the width and height dimensions of the fluid passing opening. In effect, each fluid passing opening is in itself a short pressure-drop channel. With reference to FIG. 21, this pressure-drop phenomena may be explained as follows. Using flow channel 119 as exemplary, the flow from segment 19A of flow channel 119 comes directly toward the flow from segment 19B which is coming from the opposite direction and they meet at the fluid passing opening 56A. Each flow thus makes a 90° turn and flows straight for about 0.070 inches through the length of the fluid passing opening 56A. The flows are then divided and each flow makes a 90° turn into flow restricting segments 20A and 20B of flow channel 120. It is desirable to have the length of the fluid passing opening (for example, 56A) which is also the thickness of wall 40, at least three times the thickness of the common wall 116 to get an increase in friction and pressure loss as the flow makes two sharp 90° turns in going through the fluid passing openings from one flow restricting passage to another. The same relationship exists for the remaining stations 136, 146 and 166 relative to the thickness of common wall 116.

In the preferred embodiment of FIG. 15, using a 6 mil. polythelene film, all fluid passages 118-120 have a generally rectangular configuration with a height of approximately 0.014 inch and a width of about 0.070 inch. The first fluid-passing openings 136 are spaced approximately eight inches apart. The second fluid-passing openings 146 are spaced eight inches apart with each opening 146 being located intermediate between, but spaced from, a pair of openings 136. The third fluid-passing openings 156 are spaced eight inches apart with each opening 146 being located intermediate between. Finally, the outer openings 166 are spaced eight inches apart with each opening 166 being located intermediate between, but spaced from, a pair of openings 156.

In a preferred embodiment, as the main supply channel 112 of hose 110 is pressurized at 8 psi, water flows through first inlet stations 136 located in wall member 133 which separates channel 112 and passage 118. The flow is then divided and moves within passage 118 to the nearest second inlet station 146 on either side of the first inlet station 136. Flow-restricting passage 118 has a length between inlet stations and a cross section of a size to reduce the pressure by approximately 1.0 psi within passage 118 between first fluid inlet stations 136 and second inlet stations 146.

Water then flow through the second fluid passing openings or inlet stations 146 located in water member 143 between passages 118 and 119 into passage 119 with an approximate 0.2 psi pressure loss. The flow is then divided and moves within passage 119 to the nearest third fluid passing openings or inlet stations 156 on either side of each of the second fluid passing openings 146. Flow-restricting passage 119 has a length between openings and an interior cross section of a size to reduce the pressure by approximately 1.5 psi within passage 119 between fluid passing openings 146 and fluid passing openings 156.

The water then flows through fluid passing openings or inlet stations 156 located in wall member 153 between passages 119 and 120 with an approximate 0.5 psi pressure loss into passage 120. The flow is then divided and moves within passage 120 to the nearest discharge fluid passing opening 166 on either side of fluid passing opening 156. Flow-restricting passage 120 has a length between openings and an interior cross section of a size to reduce the pressure by approximately 4.7 psi within passage 120 between the third fluid passing opening 156 and the discharge fluid passing opening 166. The flow is then discharged to the exterior of the hose through discharge fluid passing openings or outlet stations 166 in wall member 163 with a slight pressure loss of about 0.1 psi.

Because of the friction created as water passes through the small third fluid passage 120, the pressure adjacent to the discharge fluid-passing openings 166 is negligible (such as 0.1 psi or less), and the water actually drips out through the openings 166 under substantially quiescent conditions under almost no outward pressure.

The pressure drop loss between any inlet station and its nearest upstream station depends on the width and height of the intermediate flow restricting passage, the length of the same passage, and the rate of water pasing through it.

In summary, and with reference to FIG. 21, beginning with 8 psi in the main supply channel 12, there are substantially six steps of pressure reduction, as follows: 1. There is approximately 1.0 psi pressure loss within each segment, for example, segment 18C, of flow restricting channel 118; 2. There is a slight (approximately 0.2 psi) pressure loss across the second fluid passing openings, for example, opening 46B; 3. There is a pressure loss of approximately 1.5 psi within each segment, for example, segment 19B, of the second flow restricting channel 119; 4. There is another slight (approximately 0.5 psi) pressure loss across the third fluid passing openings, for example, opening 56A; 5. There is a substantial (approximately 4.7 psi) pressure loss within each segment, for example, segment 20A, of the third flow restricting channel 120; 6. Lastly, there is a very slight (approximately 0.1 psi) pressure loss across the discharge fluid passing openings, for example, opening 66B.

The flow characteristic for a hose of the preferred embodiment that has discharge outlets spaced at 8 inches and a total discharge rate of 0.5 gpm per 100 feet can be described as approximately 0.00333 gpm passing through each fluid passing opening 36, 46, 56, and 66 and approximately 0.001666 gpm passing through each flow restricting passage segment, such as those represented by 18A, 19A and 20A.

The preferred embodiment of the hose functions well in the frequently found uneven field conditions where there are sharp variations in the soil elevation such as a mound. There is substantially no flow from one segment of the flow restricting passage to another segment within the same flow restricting passage. Referring to FIG. 21, a portion of the water from inlet opening 36B flows into segment 18C where it continues to flow toward inlet opening 46B until it meets the flow of segment 18B which is coming from the opposite direction. The flows from segments 18B and 18C coming from opposite directions come together at inlet opening 46B where they both flow through opening 46B into the flow restricting passage 119. Since the flows of each segment in all the fluid restricting passages flow alternately in opposite directions, there is substantially no flow from one segment to another in any of the flow restricting passages 118–120 even if the hose 110 is on a sharp incline as much as 45°. Water supplied to a particular outlet opening 166 comes from inlet openings 36A, 36B, 36C and 36D all of which are within 12 inches of the outlet opening 166. Since there is substantially no longitudinal flow between segments in the flow restricting passages, and the outlet openings are essentially opposite their inlet openings, the flow rate out of a particular outlet opening 166 is affected by the pressure in the main supply channel at a point closest to the outlet opening 166. The hose of the preferred embodiment, with 8 psi in the main supply channel, placed in a field over a mound of soil 20 inches high still has a relatively uniform distribution pattern with only about a 10% decrease in flow on top of the mound as compared to the surrounding soil level.

Figure 19:
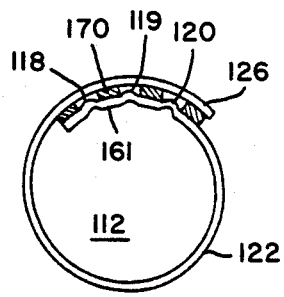
FIG. 19 is a plan end view of the hose of FIG. 15 showing the hose expanded.

As shown in FIGS. 14–17, the flow restricting channels 118, 119 and 120 are defined in part by an elongated flat sheet 170 which together with margin 126 is of greater thickness than the common wall 161. The lower thickness of the common wall 161 allows each of the flow restricting passageways 118, 119 and 120 to be reduced in size and thereby create a greater friction when the main channel 112 experiences an increase in water pressure. The reduction in cross-sectional area under the increase in water pressure is illustrated in FIG. 19.

This embodiment gives a uniform flow from a longer length of row. At the inlet end of the hose, the higher pressure (12 psi, for example) within the main channel 112 causes the thinner portion of common wall 161 to stretch and deflect outwardly as in FIG. 19 and into the flow restricting passages 118, 119 and 120, while at the same time the exterior common wall 126 along with the portion of sheet 170 that defines the flow restricting passage holds their normal dimensions because they, together, provide a heavier wall that does not stretch substantially.

This reduces the size of the flow restricting passageways and consequently reduces the flow through the passageways. As the flow travels through the main channel 112 in very long lengths of hose, the pressure within is gradually reduced due to friction so that the closed off end of the main channel 112 has substantially less pressure (6 psi, for example) than the inlet end. The thin common wall 161 at the closed off end of the hose has less pressure against it and maintains its normal circular configuration (FIG. 16) allowing the flow restricting passageways to hold their normal cross-sectional area and flow. Therefore, the flow at the inlet end and the closed off end can be substantially the same even though there is about a 50% loss in pressure due to friction within the main channel 112. The net effect is that the size of the flow restricting passages are pressure compensating to give a relatively uniform flow throughout the length of the hose. Hoses which have the pressure compensating flow restricting passages are suited to fields in which the rows run up or downhill, since the flows from the outlets remain relatively even though the pressure within the main flow channel change due to changes in elevation.

In this way, the flow rate of the preferred embodiment is pressure compensated so that the flow from an outlet opening at any given point along the hose remains relatively constant despite any pressure increase or decrease within the main supply channel.

Referring to FIG. 21, the way in which fluid passes through the water distributing network will now be described. Each fluid discharge opening, for example, 66B, is supplied with the total flow from two segments 20B and 20C of the third flow restricting passage 120; by one-half the flow from each of four segments 19A, 19B, 19C, 19D of the second flow restricting passage 119 and by one-third of the flows from each of six segments 18A, 18B, 18C, 18D, 18E, 18F of the first flow restricting passage 118. Thus, it can be seen that if, for example, segments 18C, 19B, and 20B should become clogged due to a very poor water quality, the remaining segments would still supply the discharge fluid passing opening 166B, so that a flow would be maintained to the plants even though the flow would be less than the adjoining outlets.

Thus, it can be seen that the total accumulated length of segments 18C, 19C, and 20C of the flow restricting passages should be of substantially greater length than the distance between two adjacent discharge fluid passing openings 166 and, at the same time, the flow restricting channels should be continuous so that each discharge fluid passing opening is supplied by more than one flow restricting channel segment and more than one inlet fluid passing opening. By using a long total length of flow-restricting channels, it is possible at the same time to use a larger cross-section in the flow restricting channels and still maintain the same flow rate. The larger cross sections in the flow restricting channels provide a flow path that is less apt to clog from impurities in the water.

In a similar manner, the flow for each discharge fluid passing opening 166 is supplied by 50% of the flow from each of the third inlet fluid passages 56A and 56B; by 25% of the flow through each of the second inlet fluid passing openings 46A and 46C and 50% of second inlet fluid passing opening 46B; and by 25% of the flow through each of four inlet fluid passing openings 36A, 36B, 36C and 36D. Again, it can be seen that if, for example, fluid passing openings 36A, 46A or 56A should become clogged, the remaining inlet fluid passing openings 36B, 36C, 36D, second fluid passing openings 46B, 46C and third fluid passing opening 56B would supply the discharge fluid passing opening 166.

With reference to FIGS. 22 through 25, yet another embodiment of the subject invention will be described. This embodiment is characterized by the provision of a flow restricting passage in the form of a serpentine or zig-zag path. With specific reference to FIG. 22, the structure associated with creating this path may be described. An elongated flat ribbon 202 of plastic material passes through a molding operation (to be described in detail hereinafter) in order to create the flow restricting path or channel 14. After molding, the sheet 202 as oriented in FIG. 24 contains a planar top surface 204 and a planar bottom surface 206. The sheet also defines right edge 208 and left edge 212. Extending outwardly away from surface 206 and along each of the edges 208 and 212 is an associated strips 30 and 40. Each strip extends in a generally longitudinal direction and is essentially parallel with the longitudinal axis A of the hose 210.

The strips are arranged so that they define a space between each other. This space with additional structure will become the passage 14. Positioned periodically within the space and emanating from each of the strips 30 and 40 are a series of transverse fingers 214. The fingers associated with strip 30 and the fingers associated with strip 40 are arranged in an interdigitated fashion at a predetermined spacing from each other.

In order to create a fluid communication between the path 14 and the main supply channel 12, a series of openings 36', which define an inlet station 36, are molded into the strip 30. In like manner, in order to create an exit or discharge opening for water escaping from the channel 14, there is provided in strip 40 a series of three closely spaced outlets 46' constituting an outlet station 46.

Figure 23:
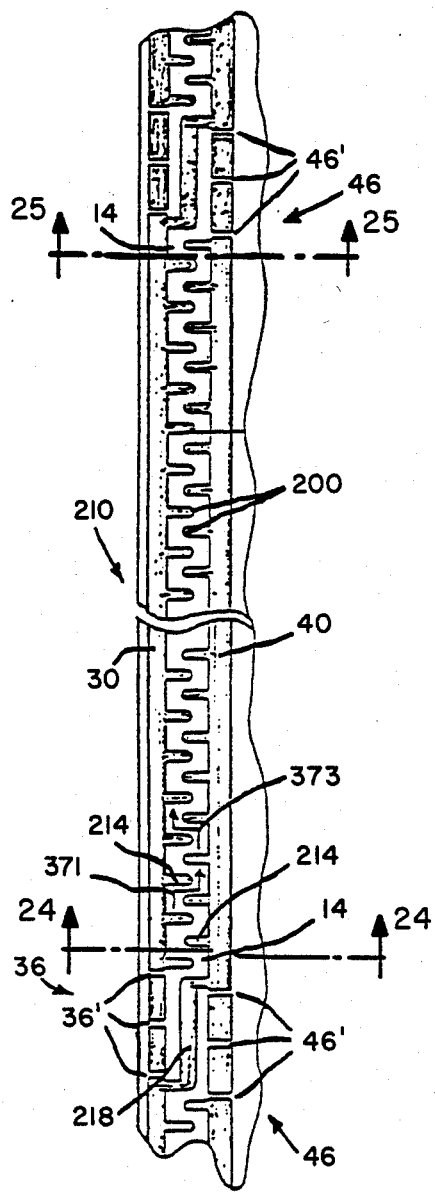
FIG. 23 is a view taken along lines 23—23 of FIG. 22.
Figure 22:
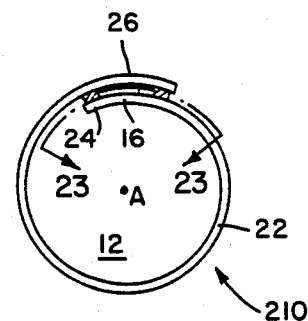
FIG. 22 is a plan end view of yet another embodiment of a hose incorporating the teachings of the present invention.

As can be seen, with reference to FIG. 23, each inlet channel 36 being formed in strip 30 is essentially opposite each outlet 46 formed in strip 40. However, through the provision of a ridge 218 placed into channel 14, the inlets and outlets are separated from each other so that for each flow restricting channel 14 there is only one inlet station 36 associated with a specific downstream outlet station 46.

As the flow moves from an inlet station 36 to its flow connecting outlet station 46, the serpentine design of the flow restricting path 14 makes it necessary for the water to travel a total distance which is substantially equal to three times the shortest distance between the inlet station 36 and its associated outlet station 46. Additional friction and pressure drop is created because the flow has to make two right angle turns as it moves past each transverse finger 214, as shown by arrows 371 and 373. The pressure created by the combination of the longer flow path and the numerous right angle turns permits the flow path 14 to have a larger cross section in order to provide less chance of clogging while still maintaining the same flow rate.

Beginning at a pressure of 8 psi in the main supply channel 12, there is approximately a 7.9 psi pressure drop within the flow restricting channel 14 and a further pressure drop of about 0.1 psi as the flow is discharged from the outlet openings 46'.

Figure 24:
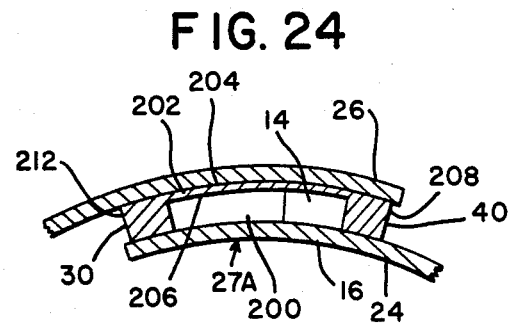
FIG. 24 is a view taken along lines 24—24 of FIG. 23.

FIG. 24 illustrates the approximate shape of common wall 24 as it is in its pressurized position 27A within passage 14 near to but downstream of inlet station 36. The common wall 16 maintains essentially the same contour as the outer margin 26 because the pressure within the channel 14 is essentially the same as the pressure in the main supply channel 12 at this point.

Figure 25:
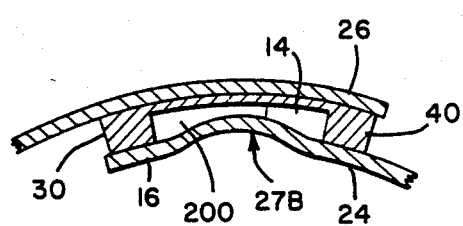
FIG. 25 is a view taken along lines 25—25 of FIG. 23.

FIG. 25 illustrates the outward deflection of the common wall 16 at point 27B due to the approximate 7.9 psi pressure differential between the main supply channel 12 and the flow restricting channel 14 at this point. The pressured position 27B is within passage 14 near to but upstream of outlet station 46. This deflection of the common wall at 27B reduces the size and the flow of the flow restricting channel 14. When the hose is operating under very low pressure, as occurs at the beginning and end of each watering cycle, the common wall 16 at point 27B returns to its normal position (like 27A in FIG. 24) and allows any accumulated foreign particles to flush out through the full size channel 14.

With reference to FIGS. 26 through 32, a method and apparatus for manufacturing a hose similar to that shown in FIG. 2 are disclosed.

Basically, the method and apparatus contemplate the disposition of a pair of thermoplastic hot melt beads in a parallel relationship extending longitudinally along the exterior surface of one of the margins of an elongated film. The film is continually advanced and passes through a molding or forming station where each of the beads is deformed according to a predetermined pattern to create the various inlet and outlet stations found in the final hose. The film continues to advance and eventually passes through a guide which causes the interior surface along the other margin to be disposed about the beads. The film then advances through the nip of a pair of forming wheels and emerges as the finally assembled hose.

With continued reference to FIGS. 26 through 32, the details of the method and apparatus will now be described.

Initially, the impervious film is produced in a flat state. The film is introduced into the machine by placing it in its flat state under the nozzle 312 of a conventional extrusion nozzle where a pair of hot melt beads 313 are being extruded, and, at the same time between, the nip of the opposed rolls 322 and 324, which constitute the molding station 314. The film is also folded back upon itself and passed through a station guide member 326 located downstream of the molding station. The film, after passing through the guide station, is received within the nip 317 of a pair of forming wheels 315 and 316, which constitute the forming station 331. The film emerges from the forming station as the complete hose. During production, the hose is continually advanced by the rotation of the forming wheels.

FIGS. 26 through 29 illustrate the details of the molding station 314 which basically comprises a pair of rotating wheels 322 and 324. Wheel 322 constitutes a bottom wheel and is mounted for rotation on an axis 341. Wheel 322 contains a flat cylindrical portion 343 bounded on either side by a pair of flange portions 345 and 347.

Wheel 324, which constitutes a top or molding wheel, is disposed above wheel 322 and rotates about an axis 351 which is essentially parallel to the rotation axis 341 of the bottom wheel. Wheel 324 has disposed about its periphery a number of teeth 353 positioned in a predetermined arrangement in order to produce a desired indentation pattern in the finished hose.

FIGS. 26 through 28 provide an example of the type of configuration that will produce a hose having an inlet and outlet pattern such as that shown for the hose in FIGS. 1 through 4. For this arrangement, the wheel 324 has a 16 inch circumfernce. Four molding assemblies 361 through 364, each of which contains a predetermined arrangement of teeth 353, are disposed about the circumference at 90° intervals. FIG. 27 shows a sectional view of the arrangement of teeth for assemblies 361 and 363, whereas FIG. 28 shows such an arrangement for assemblies 362 and 364. Typically, the teeth have a thickness in the range from about 0.030 inches to about 0.090 inches depending on the desired space between the strips.

The circumferences of the wheels 322 and 324 are arranged relative to each other to provide a nip or space therebetween for receiving the thermoplastic film and the plurality of hot melt beads.

The film and beads pass between the nip rolls 322 and 324 which rotate at the same speed that the film and beads are traveling. As a hot melt bead passes under the teeth in the top nip roll 324, each bead is molded into separate longitudinal strips. The top nip roll is spaced from the bottom nip roll at a distance so that, when the film and beads pass between the nip rolls, beads are slightly flattened within the space between the top and bottom nip rolls.

Figure 34:
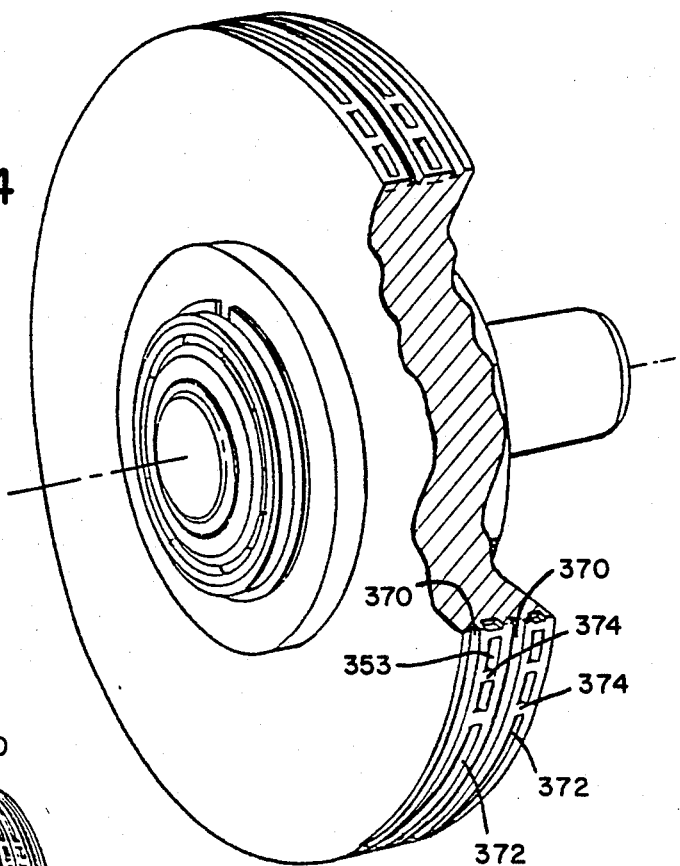
FIG. 34 is an enlarged view of the molding wheel of the macine of FIG. 33.
Figure 33:
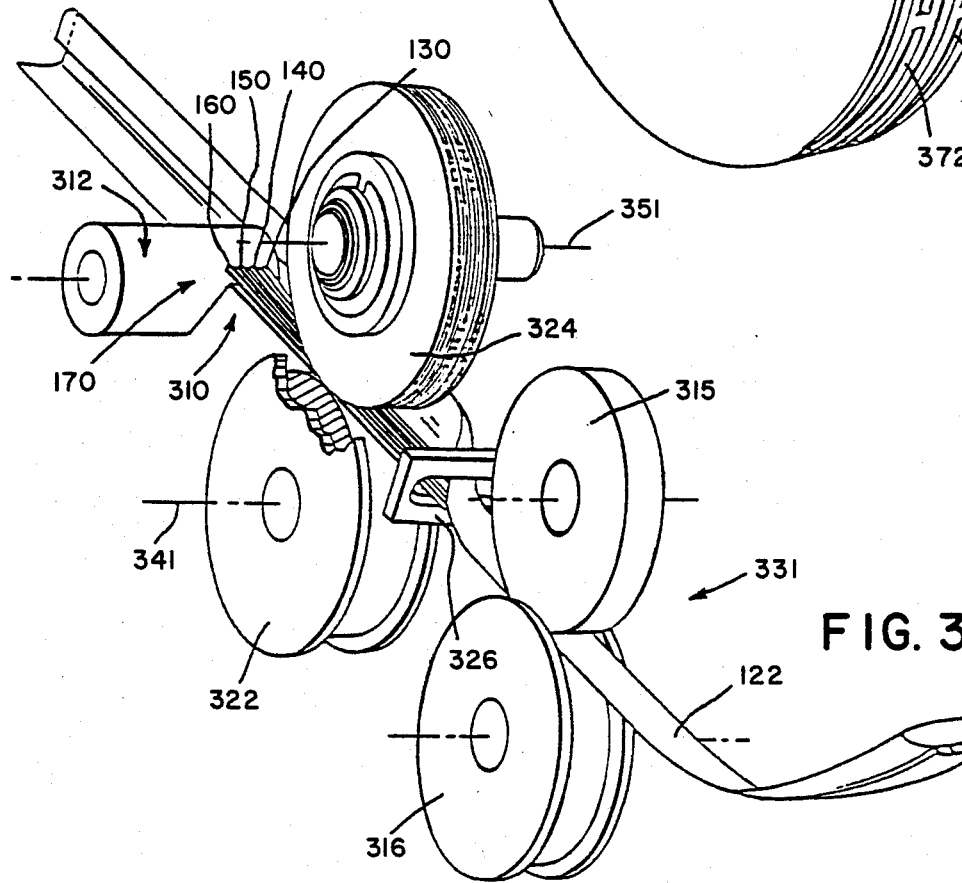
FIG. 33 is a perspective diagrammatic drawing to illustrate an embodiment of a machine used to produce a hose such as that shown in FIG. 15.

With reference to FIGS. 33 and 34, a method and apparatus for manufacturing a hose similar to that shown in FIG. 20 are disclosed. Because the method and apparatus are similar to those shown in FIGS. 26 through 32, only the differences will be described.

Figure 18:
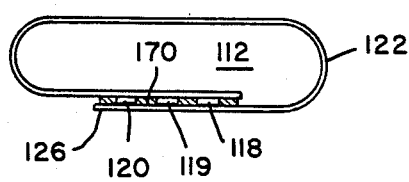
FIG. 18 is a plan end view of the hose of FIG. 15.

Basically, the method and apparatus of FIGS. 33 and 34 contemplate the disposition of a thermoplastic hot melt in a parallel relationship extending longitudinally along the interior surface of the sheet. The sheet is placed into contact with the interior surface of margin 126 of film 122 and is continually advanced until it passes through the molding or forming station 314 where each of the ridges is deformed according to a predetermined pattern to create the various inlet and outlet stations found in the final hose. The film continues to advance and eventually passes through a guide which causes the exterior surface along the other margin 124 to be disposed about the beads. The film then advances through the nip of a pair of forming wheels 315 and 316 and emerges as the finally assembled hose. See FIGS. 11 and 18 for cross sections of hoses produced by the method as the hoses emerge from the forming wheels 315 and 316. FIG. 11 shows a hose having one flow-restricting passage 14, whereas FIG. 18 shows a hose having three flow-restricting passages 118, 119 and 120.

The major differences between the method of FIG. 33 and that of FIG. 26 is in the molding wheel and the way in which the film is introduced into the machine.

Initially, the impervious film 122 is produced in a flat state. The film 122 is introduced into the machine by placing it in its flat state under the nozzle 312 of a conventional extrusion nozzle where the sheet 170 with ridges is being extruded, and, at the same time, between the nip of the opposed rolls 322 and 324, which constitute the molding station 314. The film is also folded back upon itself in a manner opposite to that shown in FIG. 26 and passed through a stationary guide member 326 located downstream of the molding station. The film, after passing through the guide station, is received within the nip of a pair of forming wheels 315 and 316, which constitute the forming station 331. The film emerges from the forming station as the complete hose. During production, the hose is continually advanced by the rotation of the forming wheels.

Wheel 324, which constitutes the molding wheel, is disposed above wheel 322 and rotates about an axis 351 which is essentially parallel to the rotation axis 341 of the bottom wheel. Wheel 324 has disposed about its periphery a number of indentations 353, circumferential grooves 370, 372, and cross members 374 positioned in a predetermined arrangement to produce the desired pattern of passages and stations in the finished hose such as that shown in FIG. 20.

Figure 36:
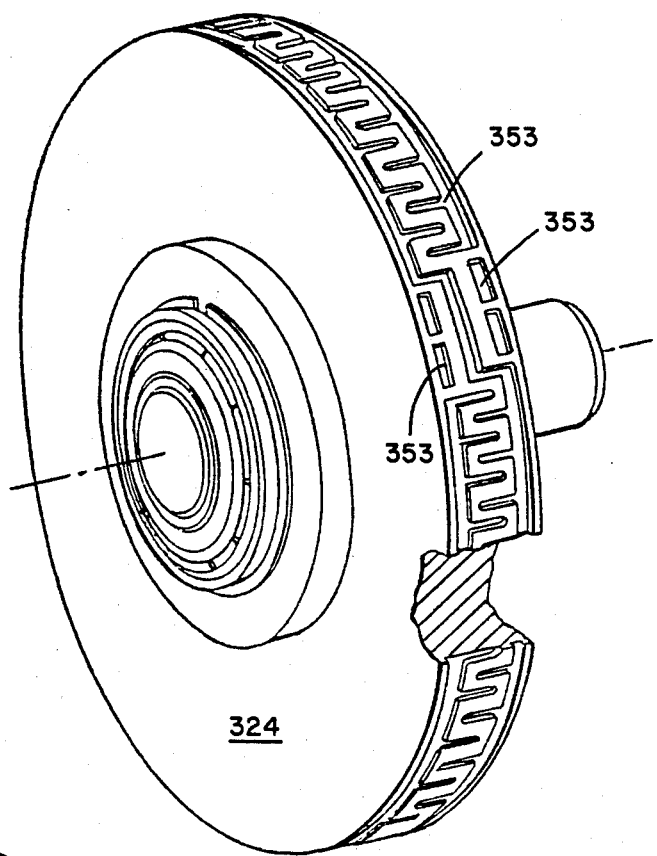
FIG. 36 is an enlarged view of the molding wheel of the machine of FIG. 35.
Figure 35:
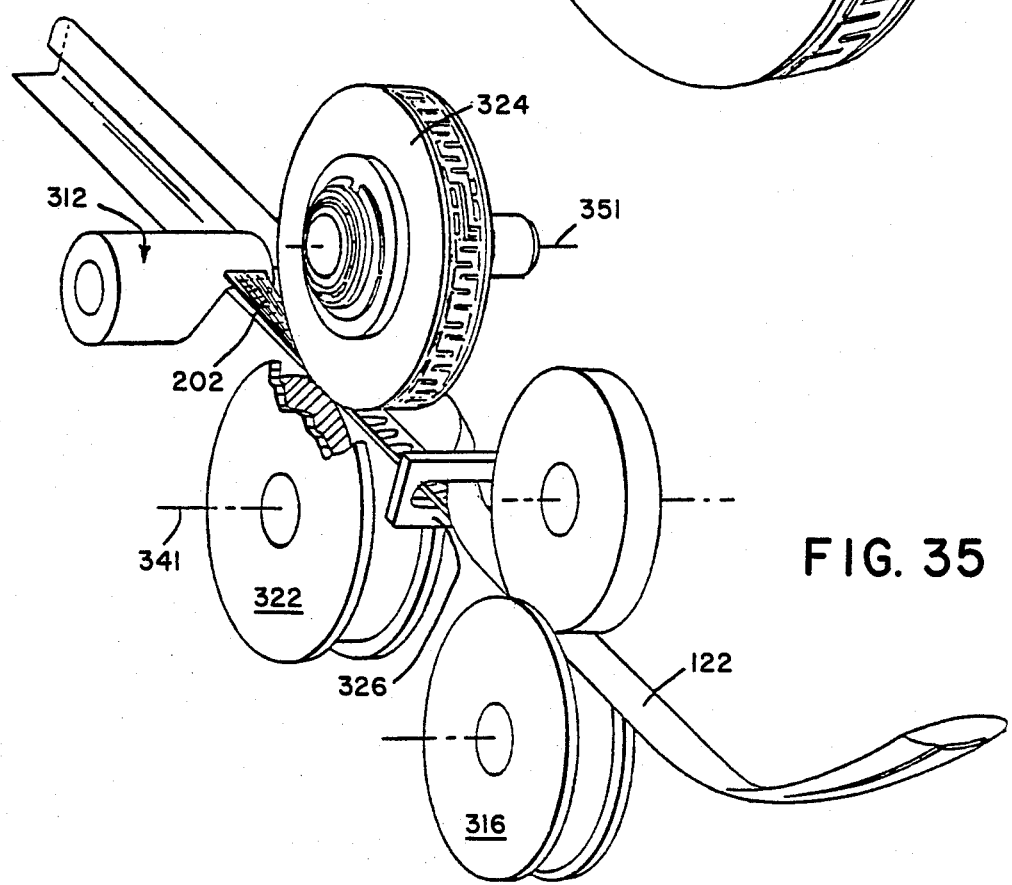
FIG. 35 is an enlarged view of the molding wheel of the machine of FIG. 23.

Finally, with reference to FIGS. 35 and 36, a method and apparatus for manufacturing a hose similar to that shown in FIG. 23 are disclosed. Because the method and apparatus are similar to those shown in FIGS. 33 and 34, only the differences will be described.

Basically, the method and apparatus of FIGS. 35 and 36 contemplate the disposition of a thermoplastic hot melt ribbon 202 in a parallel relationship extending longitudinally along the interior surface of one of the margins 26 of elongated film 22. The film and ribbon are continually advanced and pass through a molding or forming station 314 where the ribbon is deformed according to a predetermined pattern to create the various inlet and outlet stations and serpentine passageways 14 found in the final hose. The film continues to advance and eventually passes through a guide which causes the exterior surface along the other margin 24 to be disposed about the beads. The film then advances through the nip of a pair of forming wheels and emerges as the finally assembled hose.

The major difference between the method of FIG. 35 and that of FIG. 33 is in the molding wheel. In all other respects, the method and apparatus are substantially the same.

Wheel 324, which constitutes the molding wheel, is disposed above wheel 322 and rotates about an axis 351 which is essentially parallel to the rotation axis 341 of the bottom wheel. Wheel 324 has disposed about its periphery a number of indentations 353 positioned in a predetermined arrangement in order to produce the desired pattern in the finished hose shown in FIG. 23.

An alternate method and apparatus, applicable to any of the three methods just described, is to extrude a one piece flat seet to create a composite of the film 122 with appropriate structure formed along one margin as it leaves the extrusion die. For the embodiment of FIG. 26, the appropriate structure includes parallel longitudinal ridges equivalent to beads 30 and 40. In the case of the embodiment of FIG. 33, the structure is similar to sheet 170, whereas for FIG. 35, the structure is similar to ribbon 202. The flat sheet with appropriate structure, while still hot, then passes through a station to mold the structure of the preferred embodiment.

While descriptions herein have generally referred to water and fluid passages, it is understood the same hose can be used for chemical solutions such as insecticides, fungicides, fertilizers and also compressed air for soil aeration.

Since there is a wide variety of conditions encountered in the field, it is understood that the preferred embodiments are just a few of the many combinations of ratios and sizes of first fluid-passing openings, spacing of second fluid-passing openings, spacing of discharge fluid-passing openings, cross section of the fourth fluid passages, and pressures introduced into the main supply channel, which fall within the scope and function of this invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. Apparatus for manufacturing an elongated fluid-distributing hose having a main supply channel and at least one elongated flow restricting passage disposed about the main supply channel made from an elongated plastic film and an elongated narrow plastic sheet having at least two longitudinally extending continuous ridges, said apparatus comprising:

means for moving the film in a desired direction that is essentially parallel to the longitudinal axis of the film;

means for orienting the film to expose one of the two surfaces of the film along one of the longitudinal margins of the film;

extrusion nozzles means for extruding the narrow plastic sheet with continuous ridges, said nozzle means oriented relative to said one surface of the film so that said narrow plastic sheet with said ridges is disposed on said one surface essentially parallel to the longitudinal axis of the film;

means for forming a flow path from the interior to the exterior of the hose including molding means for periodically creating a permanent depression in at least one of said ridges, said depression defining a fluid-passing opening;

folding means for folding the film about its longitudinal axis so that the other of the two surfaces of the film, along the other of the longitudinal margins of the film, comes into contact with said ridges; and means for securing the other margin to said ridges to define the main supply channel and the at least one elongated flow restricting passage, the at least one elongated flow restricting passage being defined between the other margin and the narrow plastic sheet with ridges.

2. The apparatus of claim 1, wherein said means for moving comprises a pair of opposed forming wheels defining a nip through which said film is drawn during the rotation of said forming wheels.

3. The apparatus of claim 1, wherein said molding means comprises at least one molding tooth movable toward and away from said at least one ridge to create said permanent depression.

4. A method of making an elongated fluid-distributing hose having a main supply channel and at least one elongated flow restricting passage disposed about the main supply channel from an elongated plastic film and an elongated narrow plastic sheet having at least two longitudinally extending continuous ridges, said method comprising the steps of:

moving the film in a desired direction that is essentially parallel to the longitudinal axis of the film;

orienting the film to expose one of the two surfaces of the film along one of the longitudinal margins of the film;

extruding said narrow plastic sheet with continuous ridges;

disposing said narrow plastic sheet with said ridges; on said one surface, said narrow plastic sheet with said ridges being essentially parallel to the longitudinal axis of the film;

forming a flow path from the interior to the exterior of the hose including periodically creating a permanent depression in at least one of said ridges, said depression defining a fluid-passing opening;

folding the film about its longitudinal axis so that the other of the two surfaces of the film, along the other of the longitudinal margins of the film, comes into contact with each of said ridges; and securing the other margin to each of said ridges to define the main supply channel and the at least one elongated flow restricting passage, the at least one elongated flow restricting passage being defined between the other margin and the narrow plastic sheet with ridges.

5. The method of claim 4, wherein said moving step comprises drawing said film through the nip of a pair of opposed rotating forming wheels.

6. The method of claim 4, further comprising the step of providing said film as a flat sheet.

7. The method of claim 4, wherein said molding step comprises moving at least one molding tooth toward and away from each of said ridges to create said permanent depression.

8. The apparatus of claim 3 wherein said molding means further comprises a pair of opposed wheels defining a nip through which said plastic sheet with ridges passes, one of said pair of wheels supporting said plastic sheet, the other of said pair of wheels carrying a plurality of said molding teeth about its periphery in a predetermined arrangement to produce a desired indentation pattern in said ridges.

9. Apparatus for manufacturing an elongated fluid-distributing hose having a main supply channel and at least one elongated flow restricting passage disposed about the main supply channel made from an elongated plastic film and an elongated narrow plastic sheet, said apparatus comprising:

means for moving the film in a desired direction that is essentially parallel to the longitudinal axis of the film;

means for orienting the film to expose one of the two surfaces of the film along one of the longitudinal margins of the film;

extrusion nozzle means for extruding the narrow plastic sheet, said nozzle means oriented relative to said one surface of the film so that said sheet is diposed on said one surface essentially parallel to the longitudinal axis of the film;

means for forming a flow path from the interior to the exterior of the hose including molding means for permanently creating at least two parallel continuous ridges spaced from each other and extending longitudinally along said narrow plastic sheet, said molding means also for periodically creating a permanent depression in at least one of said ridges, said depression defining a fluid-passing opening;

folding means for folding the film about its longitudinal axis so that the other of the two surfaces of the film, along the other of the longitudinal margins of the film, comes into contact with said ridges; and means for securing the other margin to said ridges to define the main supply channel and the at least one elongated flow restricting passage, the at least one elongated flow restricting passage being defined between the other margin and the narrow plastic sheet with ridges.

10. The apparatus of claim 9 wherein said molding means includes means for forming said flow-restricting passage in the form of a serpentine path.

11. The apparatus of claim 10 wherein said serpentine path is defined by a series of transverse fingers eminating from said parallel ridges in interdigitated fashion at predetermined spacing from each other.

12. Apparatus for manufacturing an elongated fluid-distributing hose having a main supply channel and at least one elongated flow restricting passage disposed about the main supply channel made from an elongated plastic film including an elongated narrow plastic sheet disposed along the edge of the film and having at least two longitudinally extending continuous ridges, said apparatus comprising:

extrusion nozzle means for extruding a flat elongated film having opposed longitudinal margins and an elongated narrow plastic sheet with continuous ridges formed on one surface of said film along one of the longitudinal margins of said film;

means for moving the film in a desired direction that is essentially parallel to the longitudinal axis of the film;

means for orienting the film to expose one of the two surfaces of the film along one of the longitudinal margins of the film so that the surface of the film bearing said narrow plastic sheet with said ridges is oriented for subsequent forming;

means for forming a flow path from the interior to the exterior of the hose including molding means for periodically creating a permanent depression in at least one of said ridges, said depression defining a fluid passing opening;

folding means for folding the film about its longitudinal axis so that the other of the two surfaces of the film, along the other of the other of the longitudinal margins of the film, comes into contact with said ridges; and means for securing the other margin to said ridges to define the main supply channel and the at least one elongated flow restricting passage, the at least one elongated flow restricting passage being defined between the other margin and the narrow plastic sheet with ridges.

13. The apparatus of claim 1, wherein the other wall is a common wall between the main supply channel at the at least one elongated flow restricting passage.

14. A method for manufacturing an elongated fluid distributing hose having a main supply channel and at least one elongated flow restricting passage disposed about the main supply channel made from an elongated plastic film and an elongated plastic ribbon;

moving the film in a desired direction that is essentially parallel to the longitudinal axis of the film;

orienting the film to expose one of the two surfaces of the film along one of the longitudinal margins of the film;

extruding said plastic ribbon, said nozzle means oriented relative to said one surface of the film so that said ribbon is deposited on and attached to said one surface essentially parallel to the longitudinal axis of the said film;

molding the surface of said plastic ribbon into a flat sheet having at least two continuous marginal ridges;

forming a flow path from the interior to the exterior of the hose including periodically creating a permanent depression in at least one of said ridges;

folding the film about its longitudinal axis so that one of the surfaces of the film along the other of the longitudinal margins of the film comes into contact with said ridges; and securing the other margin to said ridges to define the main supply channel and the at least one elongated flow restricting passage, the at least one elongated flow restricting passage being defined between the other margin and the narrow plastic sheet with ridges;

said permanent depression and said other margin defining a fluid passing opening.

15. The method of claim 14 in which the molding attaches the flat sheet to said one surface of the film creating a wall member whose combined thickness and strength is greater than the opposing margin.

16. The method of claim 14 in which ridges, said flat sheet and said other margin define a flow restricting passage.

17. Apparatus for manufacturing an elongated fluid distributing hose made from an elongated plastic film and an elongated flat plastic ribbon;

means for moving the film in a desired direction that is essentially parallel to the longitudinal axis of the film;

means for orienting the film to expose one of the two surfaces of the film along one of the longitudinal margins of the film;

extrusion nozzle means for extruding said flat plastic ribbon, said nozzle means oriented relative to said one surface of the film so that said ribbon is deposited on and attached to said one surface essentially parallel to the longitudinal axis of the said film;

molding means to form permanent depressions in said plastic ribbon into a predetermined pattern of inlet and outlet stations with passageways therebetween;

folding means for folding the film about its longitudinal axis so that one of the surfaces of the film along the other of the longitudinal margins of the film comes into contact with said plastic ribbon; and means for securing said other margin to said plastic ribbon; said inlets and outlets together with said passageways forming fluid passage from the interior of the hose to the exterior of said hose.

18. The apparatus of claim 17 wherein at least one of the passageways is in the form of a serpentine path.

19. A method for manufacturing an elongated fluid distributing hose made from an elongated plastic film and an elongated flat plastic ribbon;

moving the film in a desired direction that is essentially parallel to the longitudinal axis of the film;

orienting the film to expose one of the two surfaces of the film along one of the longitudinal margins of the film;

extruding said flat plastic ribbon from a nozzle means, said nozzle means oriented relative to said one surface of the film so that said ribbon is deposited on and attached to said one surface essentially parallel to the longitudinal axis of the said film;

forming permanent depressions in said plastic ribbon into a predetermined pattern of inlet and outlet stations with passageways therebetween;

folding the film about its longitudinal axis so that one of the surfaces of the film along the other of the longitudinal margins of the film comes into contact with said plastic ribbon; and securing said other margin to said plastic ribbon; said inlets and outlets together with said passageways forming fluid passages from the interior of the hose to the exterior of said hose.

20. The method of claim 19 wherein at least one of the passageways is formed into a serpentine path.

* * * * *